US009280865B2

(12) United States Patent
Berry, III et al.

(10) Patent No.: US 9,280,865 B2
(45) Date of Patent: Mar. 8, 2016

(54) IDENTIFYING DEFECTS IN A ROULETTE WHEEL (71) Applicant: IGT, Reno, NV (US)

(72) Inventors: William R. Berry, III, Washoe Valley, NV (US); William A. Nelson, Reno, NV (US)

(73) Assignee: IGT, Las Vegas, NV (US)

(*) Notice: Subject to any disclaimer, the term of this patent is extended or adjusted under 35 U.S.C. 154(b) by 703 days.

(21) Appl. No.: 13/647,126

(22) Filed: Oct. 8, 2012

(65) Prior Publication Data

US 2014/0098219 A1 Apr. 10, 2014

(51) Int. Cl.
G07F 17/32 (2006.01)
H04N 7/18 (2006.01)

(52) U.S. Cl.
CPC .............. *G07F 17/32* (2013.01); *G07F 17/322* (2013.01); *H04N 7/18* (2013.01)

(58) Field of Classification Search
CPC ............................... G07F 17/32; G07F 17/322
USPC ......................................................... 348/125
See application file for complete search history.

(56) References Cited

U.S. PATENT DOCUMENTS

| 5,801,766 | A * | 9/1998 | Alden ........................... 348/157 |
| 6,866,581 | B2 | 3/2005 | Martinek et al. |
| 6,887,157 | B2 | 5/2005 | LeMay et al. |
| 6,890,255 | B2 | 5/2005 | Jarvis et al. |
| 6,908,390 | B2 | 6/2005 | Nguyen et al. |
| 7,367,885 | B2 | 5/2008 | Escalera et al. |
| 7,465,230 | B2 | 12/2008 | LeMay et al. |
| 7,470,182 | B2 | 12/2008 | Martinek et al. |
| 7,572,183 | B2 | 8/2009 | Olivas et al. |
| 7,572,186 | B2 | 8/2009 | LeMay et al. |
| 7,699,706 | B2 | 4/2010 | Walker et al. |
| 7,708,635 | B2 | 5/2010 | Walker et al. |
| 7,753,790 | B2 | 7/2010 | Nguyen et al. |
| 7,753,797 | B2 | 7/2010 | Walker et al. |
| 7,806,761 | B2 | 10/2010 | Walker et al. |
| 7,837,556 | B2 | 11/2010 | Breckner et al. |
| 7,867,084 | B2 | 1/2011 | Martinek et al. |
| 7,874,908 | B2 | 1/2011 | Walker et al. |
| 7,896,741 | B2 | 3/2011 | Kuehling et al. |
| 7,901,289 | B2 | 3/2011 | Schlottmann et al. |
| 7,909,696 | B2 | 3/2011 | Beaulieu et al. |
| 7,918,730 | B2 | 4/2011 | Brosnan et al. |
| 7,934,993 | B2 | 5/2011 | Kuehling et al. |
| 7,934,994 | B2 | 5/2011 | LeMay et al. |
| 7,988,559 | B2 | 8/2011 | Yoseloff et al. |
| 7,997,981 | B2 | 8/2011 | Rowe et al. |
| 8,002,623 | B2 | 8/2011 | Resnick et al. |
| 8,012,019 | B2 | 9/2011 | Escalera et al. |

(Continued)

*Primary Examiner* — Jamie Atala
*Assistant Examiner* — Fabio Lima
(74) *Attorney, Agent, or Firm* — Neal, Gerber & Eisenberg LLP (57) ABSTRACT

Systems and methods for identifying defects in a roulette wheel are described. A first trajectory of a roulette ball may be determined after launch of the roulette ball by capturing movement of the roulette ball on the roulette wheel. The roulette wheel has a region where the roulette ball orbits and spins around before the roulette ball falls into a roulette number pocket. The determining step may be repeated to determine additional trajectories, and a plurality of areas that the roulette ball avoided during travel along the trajectories may be identified. A graphical representation of the plurality of avoided areas may be generated to identify regions of the roulette wheel that include defects.

20 Claims, 5 Drawing Sheets (56) References Cited

U.S. PATENT DOCUMENTS

| | | |
|---|---|---|
| 8,025,562 B2 | 9/2011 | Walker et al. |
| 8,025,566 B2 | 9/2011 | Walker et al. |
| 8,029,362 B2 | 10/2011 | Walker et al. |
| 8,038,520 B2 | 10/2011 | Walker et al. |
| 8,038,523 B2 | 10/2011 | Walker et al. |
| 8,047,908 B2 | 11/2011 | Walker et al. |
| 8,092,293 B2 | 1/2012 | Richards et al. |
| 8,123,616 B2 | 2/2012 | Wells et al. |
| 8,206,215 B2 | 6/2012 | Moyle et al. |
| 8,210,922 B2 | 7/2012 | Williams et al. |
| 8,235,810 B2 | 8/2012 | Brunet de Courssou et al. |
| 8,267,767 B2 | 9/2012 | Kryuchkov et al. |
| 8,308,547 B2 | 11/2012 | Walker et al. |
| 8,353,757 B2 | 1/2013 | Walker et al. |
| 8,366,531 B2 | 2/2013 | Walker et al. |
| 8,384,710 B2 | 2/2013 | Schlottmann et al. |
| 8,460,103 B2 | 6/2013 | Mattice et al. |
| 8,500,535 B2 | 8/2013 | Brosnan et al. |
| 8,506,385 B2 | 8/2013 | Brunet De Courssou et al. |
| 8,523,671 B2 | 9/2013 | Brosnan et al. |
| 8,523,672 B2 | 9/2013 | Kryuchkov et al. |
| 8,550,893 B2 | 10/2013 | Brosnan et al. |
| 8,645,685 B2 | 2/2014 | Nguyen et al. |
| 8,690,662 B2 | 4/2014 | Walker et al. |
| 8,715,058 B2 | 5/2014 | Pennington et al. |
| 8,715,067 B2 | 5/2014 | Walker et al. |
| 8,727,873 B2 | 5/2014 | Frady |
| 8,771,051 B2 | 7/2014 | Mattice et al. |
| 8,784,175 B2 | 7/2014 | Walker et al. |
| 8,790,187 B2 | 7/2014 | Walker et al. |
| 8,905,834 B2 | 12/2014 | Wells |
| 8,956,223 B2 | 2/2015 | Frady |
| 8,992,298 B2 | 3/2015 | Walker et al. |
| 8,992,299 B2 | 3/2015 | Walker et al. |
| 8,992,320 B2 | 3/2015 | Brosnan et al. |
| 9,033,785 B2 | 5/2015 | Walker et al. |
| 9,039,410 B2 | 5/2015 | Walker et al. |
| 9,072,967 B2 | 7/2015 | Brosnan et al. |
| 9,123,203 B2 | 9/2015 | Johnson |
| 9,123,204 B2 | 9/2015 | Rader et al. |
| 2003/0060263 A1* | 3/2003 | Pearce et al. .................... 463/17 |
| 2004/0002380 A1 | 1/2004 | Brosnan et al. |
| 2004/0192442 A1 | 9/2004 | Wells et al. |
| 2004/0198479 A1 | 10/2004 | Martinek et al. |
| 2005/0215307 A1 | 9/2005 | Jarvis et al. |
| 2006/0217174 A1 | 9/2006 | Walker et al. |
| 2006/0258427 A1 | 11/2006 | Rowe et al. |
| 2007/0004513 A1 | 1/2007 | Wells et al. |
| 2007/0060237 A1 | 3/2007 | Rowe et al. |
| 2007/0135216 A1 | 6/2007 | Martinek et al. |
| 2007/0259717 A1 | 11/2007 | Mattice et al. |
| 2007/0293320 A1 | 12/2007 | Nguyen et al. |
| 2008/0058097 A1 | 3/2008 | Martinek et al. |
| 2008/0076529 A1 | 3/2008 | Richards et al. |
| 2008/0076546 A1 | 3/2008 | Moyle et al. |
| 2008/0113745 A1 | 5/2008 | Williams et al. |
| 2009/0036208 A1 | 2/2009 | Pennington et al. |
| 2009/0055205 A1 | 2/2009 | Nguyen et al. |
| 2009/0124379 A1 | 5/2009 | Wells |
| 2009/0143141 A1 | 6/2009 | Wells et al. |
| 2009/0174141 A1* | 7/2009 | Witty ........................ 273/142 E |
| 2009/0221363 A1 | 9/2009 | Brunet de Courssou et al. |
| 2009/0264190 A1 | 10/2009 | Davis et al. |
| 2010/0016073 A1 | 1/2010 | Goldstein et al. |
| 2010/0062838 A1 | 3/2010 | Nguyen et al. |
| 2010/0197383 A1 | 8/2010 | Rader et al. |
| 2010/0222140 A1 | 9/2010 | Dewaal |
| 2011/0165929 A1 | 7/2011 | Brosnan et al. |
| 2011/0165930 A1 | 7/2011 | Brosnan et al. |
| 2011/0165931 A1 | 7/2011 | Brosnan et al. |
| 2011/0177867 A1 | 7/2011 | Yoseloff et al. |
| 2011/0179409 A1 | 7/2011 | Yoseloff et al. |
| 2011/0244939 A1* | 10/2011 | Cammegh et al. .............. 463/17 |
| 2013/0059638 A1 | 3/2013 | Nicely |
| 2013/0059647 A1 | 3/2013 | Nicely |
| 2013/0084960 A1 | 4/2013 | Frady |
| 2013/0084972 A1 | 4/2013 | Frady |
| 2013/0084998 A1 | 4/2013 | Frady |
| 2013/0130765 A1 | 5/2013 | Walker et al. |
| 2013/0143633 A1 | 6/2013 | Walker et al. |
| 2013/0143674 A1 | 6/2013 | Martinek et al. |
| 2014/0018150 A1 | 1/2014 | Wells et al. |
| 2014/0031097 A1 | 1/2014 | Brosnan et al. |
| 2014/0038677 A1 | 2/2014 | Brosnan et al. |
| 2014/0058992 A1* | 2/2014 | Lucey et al. ..................... 706/46 |
| 2014/0295930 A1 | 10/2014 | Walker et al. |
| 2015/0005068 A1* | 1/2015 | Inoue et al. ..................... 463/31 |
| 2015/0187163 A1 | 7/2015 | Brosnan et al. |

* cited by examiner

IDENTIFYING DEFECTS IN A ROULETTE WHEEL

BACKGROUND

A roulette gaming machine is a gaming machine that works on the system of picking a winning number determined when a roulette ball comes to a resting position at the winning number. A player's choice for a wager on the roulette gaming machine may include combinations of numbers, colors, odds, evens, etc. If a roulette gaming machine is not working correctly, then the legitimacy of the game and the odds of winning the game will not be accurate. For example, imperfections in the roulette wheel may make the outcome of the game less random or more predictable. The imperfections may include manufacturing defects, ordinary wear and tear of the wheel, incorrect leveling of the roulette wheel or the roulette table, and so forth.

The imperfections of the roulette wheel may mean that the roulette ball is likely to avoid areas of the roulette wheel. If such areas are avoided, then a player can make predictions about where the roulette ball is less likely to land, which may skew the odds and create a less random game outcome.

SUMMARY

According to various example embodiments, a method for identifying defects in a roulette wheel is disclosed. The method includes determining a first trajectory of a roulette ball after a launch of the roulette ball by capturing movement of the roulette ball on the roulette wheel having a region where the roulette ball orbits and spins around on before falling into a roulette number pocket. The method further includes repeating the determining step to determine additional trajectories. The method further includes determining a plurality of areas that the roulette ball avoided during travel along the trajectories. The method further includes generating a graphical representation of the plurality of avoided areas to identify regions of the roulette wheel that include defects.

According to one example embodiment, a controller for a gaming machine is disclosed. The controller includes a processor configured to determine a first trajectory of a roulette ball after a launch of the roulette ball by capturing movement of the roulette ball on the roulette wheel having a region where the roulette ball orbits and spins around on before falling into a roulette number pocket. The processor is further configured to repeat the determining step to determine additional trajectories. The processor is further configured to determine a plurality of areas that the roulette ball avoided during travel along the trajectories. The processor is further configured to generate a graphical representation of the plurality of avoided areas to identify regions of the roulette wheel that include defects.

According to another example embodiment, a computer-readable storage medium is disclosed. The storage medium has machine instructions stored therein, the instructions being executable by a processor to cause the processor to perform operations. The operations include determining a first trajectory of a roulette ball after a launch of the roulette ball by capturing movement of the roulette ball on the roulette wheel having a region where the roulette ball orbits and spins around on before falling into a roulette number pocket. The operations further include repeating the determining step to determine additional trajectories. The operations further include determining a plurality of areas that the roulette ball avoided during travel along the trajectories. The operations further include generating a graphical representation of the plurality of avoided areas to identify regions of the roulette wheel that include defects.

BRIEF DESCRIPTION OF THE DRAWINGS

The details of one or more implementations are set forth in the accompanying drawings and the description below. Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

Figure 1:
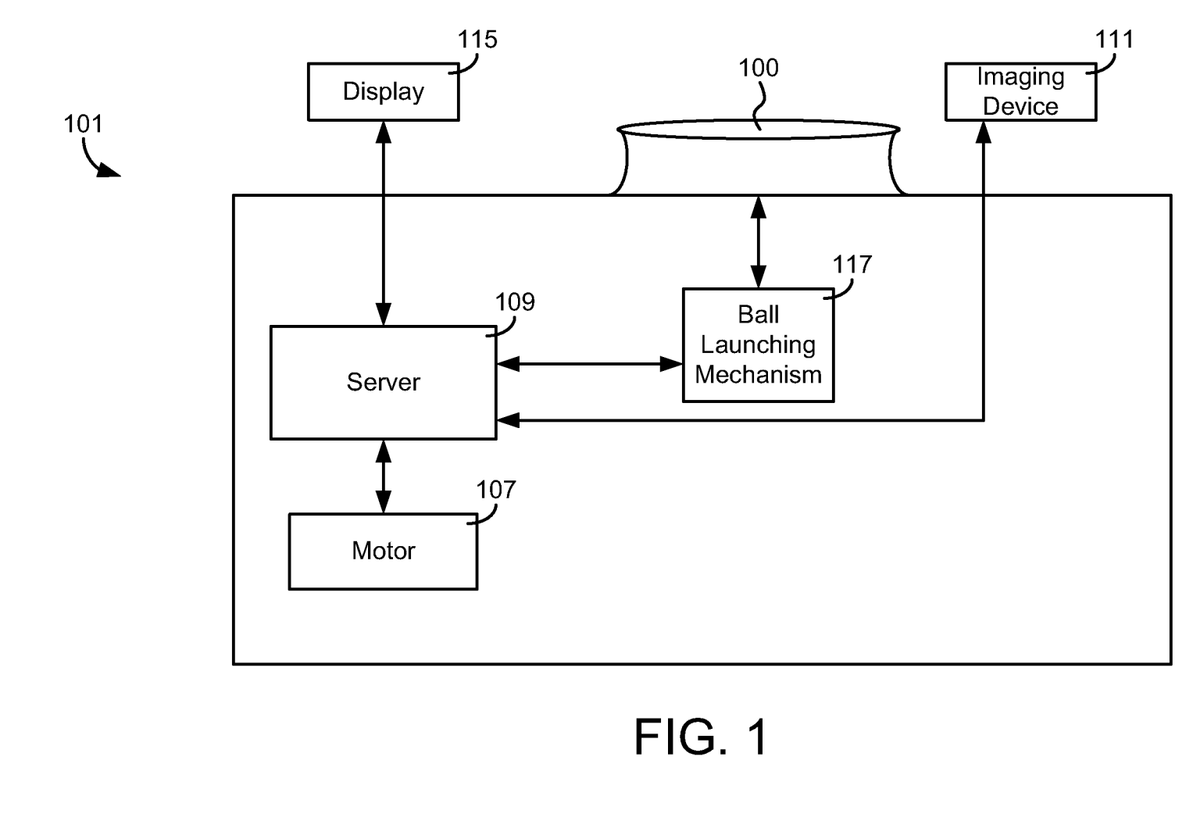
FIG. 1 is a block diagram of a roulette game system, according to a described implementation.

Referring to FIG. 1, a block diagram of a roulette game system 101 is shown. Roulette wheel 100 may be coupled to a ball launching mechanism 117. Ball launching mechanism 117 may be configured to propel a roulette ball onto roulette wheel 100 and may launch the roulette ball via any type of mechanical action. Ball launching mechanism 117 may receive an input from processor 103 and use the input as a trigger for propelling the roulette ball.

Roulette game system 101 is shown to include a display 115 connected to server 109. Display 115 may be configured to provide a display of the roulette game (e.g., to record a video of each game, to provide a display to players or observers, etc.).

Roulette game system 101 is shown to include an imaging device 111. Imaging device 111 may be a camera or other recording device or sensor configured to track movement of the roulette ball around roulette wheel 100. Imaging device 111 may be positioned directly above roulette wheel 100, according to one embodiment. Imaging device 111 may also be used to record a video or images of each roulette game, and to provide the video or images to display 115. Imaging device 111 may be connected to server 109 and provide the video and images to server 109 for processing. Server 109 may be a server local to roulette wheel system 100, may be remotely located from system 100, or may be multiple servers located at one or both of local to and remotely from system 100.

Server 109 may generally be configured to receive input from imaging device 111. Server 109 may use the input (e.g., a video feed) and determine a trajectory of a roulette ball during a roulette game. The individual frames of the video feed may be used to determine the trajectory of the roulette ball. The trajectory of the roulette ball for each game may then be added together from game to game to provide a graphical representation of areas the roulette ball is more likely to avoid or occupy on the static portion of the roulette wheel.

Server 109 may receive a video and or images from imaging device 111. Imaging device 111 may be configured to provide a grayscale video feed of roulette wheel 100, and server 109 may use each frame of the video feed. The frames per second (FPS) of the video feed may be 30 FPS, according to one embodiment, but may vary according to other embodiments. Server 109 may determine a difference between two frames of the video feed (e.g., determining the pixel delta of the two frames). If the difference is large enough, then the difference may be added to a master frame configured to show roulette ball movement. The difference between the two frames may be found by "subtracting" one frame from the other, leaving only the differing parts of the two frames (e.g., the roulette ball in the two frames).

Once the differences across all frames are tracked and added to the master frame, the master frame's pixel values may be scaled. For example, the pixel values in the master frame may be scaled from 0 to 240. The pixel values in the master frame may be values representing a hue, saturation, and value (HSV) representation of points in a color model. After scaling the pixel values, the pixel values may be converted from a HSV scheme to a red, green, and blue (RGB) color space. The resulting image may then be presented to a user (e.g., via server 109). This color space conversion is used to create a heat map (shown in greater detail in FIG. 4). The heat map is used to show which areas of roulette wheel 100 the roulette ball avoided over many launches compared to other areas. In one embodiment, blue areas in the heat map may illustrate areas the ball occupied the least, and red areas may illustrate areas in which the ball frequently occupied.

Some areas of roulette wheel 100 may not affect roulette ball trajectory. For example, the center rotating part of the wheel, including the hat, spindle, and pockets of roulette wheel 100 move, but do not affect roulette ball movement, from frame to frame, and will show up when determining a difference between two frames. Therefore, the pixel data for these areas may be clamped. The clamping step may also be used to clean up the master frame image because there may be occasional video artifacts that are of no value to determine ball trajectories that may show up in the master frame. The clamping step may include trimming the uppermost and lowermost values of the summed pixel data for all frames before the conversion of the color space from HSV to RGB.

Roulette wheel system 101 is further shown to include a motor 107 driving operation of roulette wheel system 101 and server 109. Server 109 may control when the ball is launched by providing a signal to ball launching mechanism 117 and motor 107.

Figure 2:
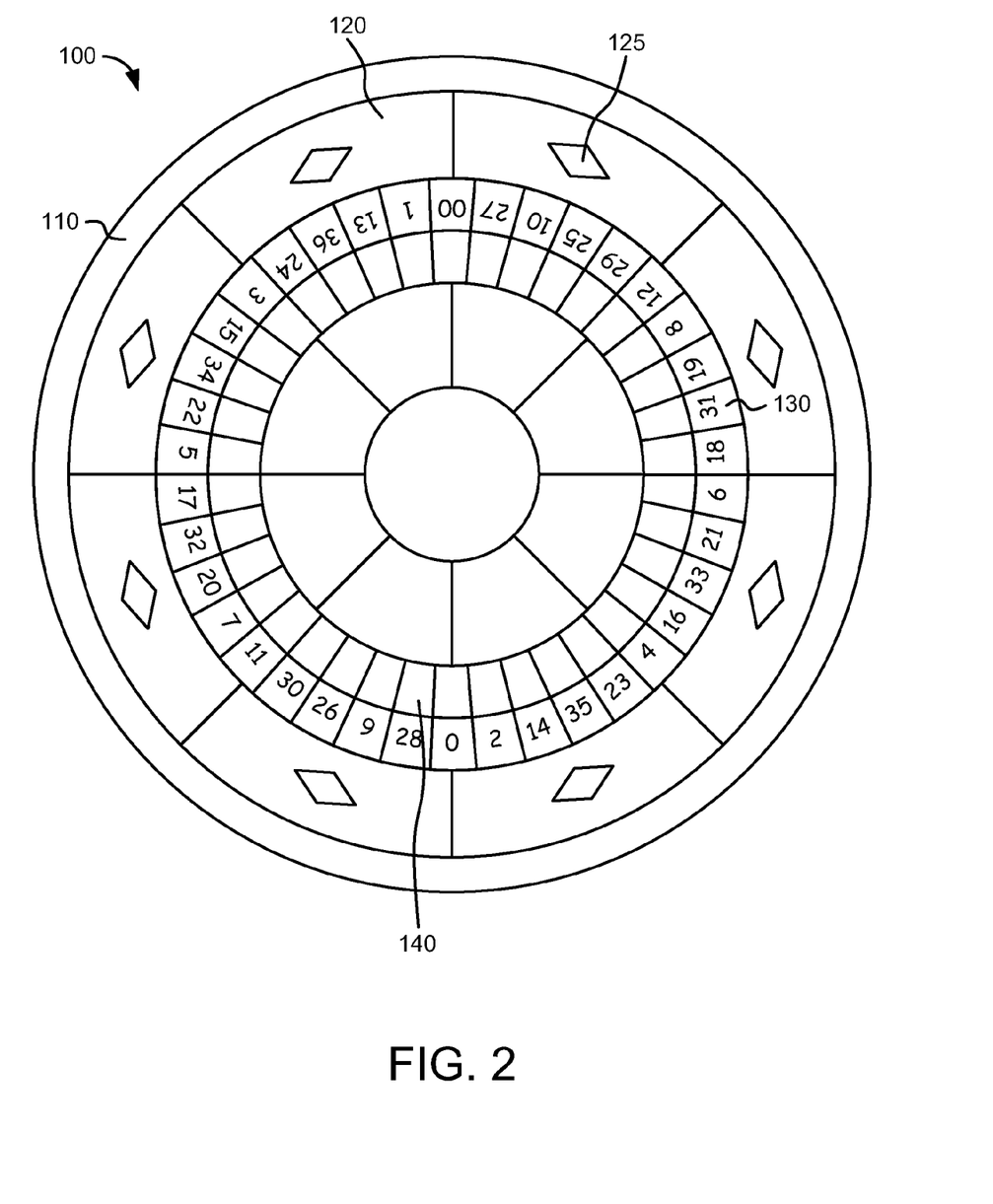
FIG. 2 is an illustration of a roulette wheel, according to a described implementation.
Figure 3:
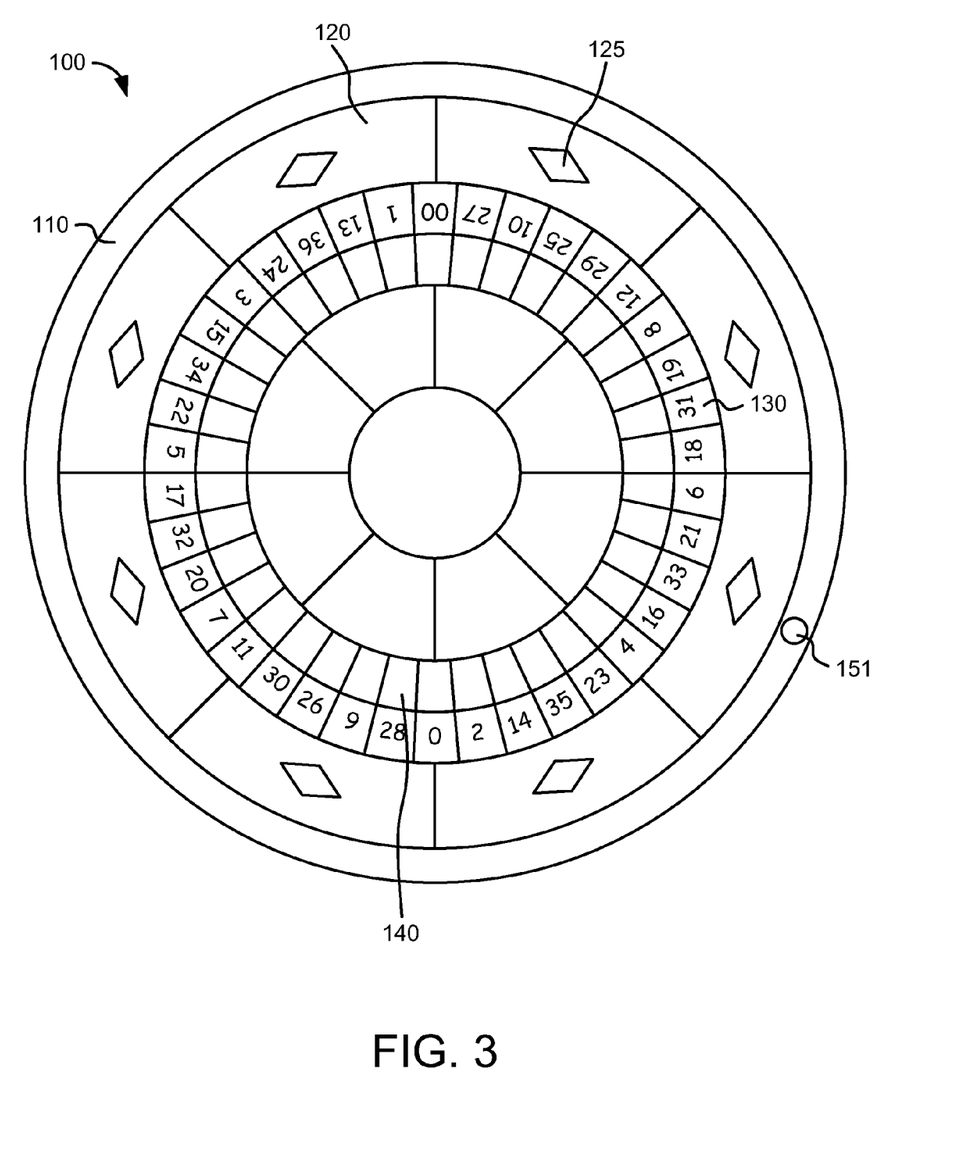
FIG. 3 is an illustration of a roulette ball on a track of the roulette wheel, according to a described implementation.

Referring to FIGS. 2 and 3, an illustration of a roulette wheel for a roulette gaming machine is shown. Roulette wheel 100 may include a roulette wheel ornament in the center. The roulette wheel ornament may come in a variety of shapes and sizes. The roulette wheel ornament may include the roulette wheel manufacturer's name and/or personalized with the gaming operator's specification. In some implementations, the roulette wheel ornament includes a hollow housing where a spare roulette ball is stored.

In some embodiments, roulette wheel 100 may be situated on a roulette table arrangement with a betting station. The roulette table arrangement may include display 115 to display a betting layout of the betting station and any bets placed, as previously indicated. Display 115 may show the roulette game so that all players and other casino goers may view wheel 100 and the game outcome. Imaging device 111 may be used to record a video of each game played at roulette wheel 100. Roulette wheel 100 may be surrounded by a circular runway or track 110. A release opening may be located along the outer boundary of track 110. Once players have placed their wagers, the roulette ball may be released.

In operation, wheel 100 is rotated, roulette ball 151 is propelled through a release opening onto track 110. Track 110 is a static component of roulette wheel 100 and may be slightly sloped. Track 110 may be very smooth to allow roulette ball 151 to roll free and with minimal friction. In some implementations, track 110 may have a more curved edge to increase friction, meaning the ball spin will last for a shorter period of time.

Display 115 may show the release of roulette ball 151 onto track 110. The direction of roulette ball 151 may vary from spin to spin of roulette wheel 100. Roulette ball 151 spins around roulette wheel 100.

Roulette ball 151 is set in motion so that it may travel around track 110 in either a clockwise or counter-clockwise direction. Roulette ball 151 may be subjected to a number of forces, e.g., gravity, friction, air blasts, collisions, etc., that slow ball 115 down until it can no longer travel along track 110. Then, roulette ball 115 crosses over region 120 of roulette wheel 100. Region 120, sometimes referred to as a bowl, is a static portion of roulette wheel 100. Region 120 may include roulette wheel stoppers or pins 125. Roulette wheel stoppers 125 may be fixed onto wheel 100 below track 110 and also remain static. Roulette wheel stoppers 125 are illustrated in the shape of diamonds, but may come in different shapes and sizes. Roulette wheel stoppers 125 are designed in a way to increase the variety of bounce of roulette ball 151.

As the forces acting on roulette ball 151 cause it to slow down, roulette ball 151 revolves closer and closer to the center, where it may strike one of the stoppers 125, at which point roulette ball 151 falls onto section 130, where roulette ball 151 may bounce and then, into roulette number pocket 140 at the end of the spin around track 110 and the game outcome is determined. The number of roulette number pockets 140 varies depending on the style of roulette wheel 100. For example, in FIGS. 2 and 3, there are 38 roulette number pockets 140. In another implementation, there may be 37 roulette number pockets 140.

Roulette number pockets 140 may vary in shape, size, depth, etc. The variation between roulette number pockets 140 may contribute to how roulette ball 151 bounces, lands, etc. Roulette number pockets 140 may be separated by metal frets, which are designed to hold roulette ball 151 on the moving roulette wheel 100. The shape and size of the metal frets may determine the depth of roulette number pockets 140.

The game outcome may be illustrated by roulette ball 151 landing in a roulette number pocket 140 (shown as pocket 31). The game outcome may be generated by a mechanical device. In some implementations, sensors may be used to detect roulette ball 151 and the game outcome.

Irregularities on track 110 and section 120 may be identified that may cause the ball trajectories to either concentrate on or avoid regions on these static (non-rotating) components of wheel 100.

Figure 4:
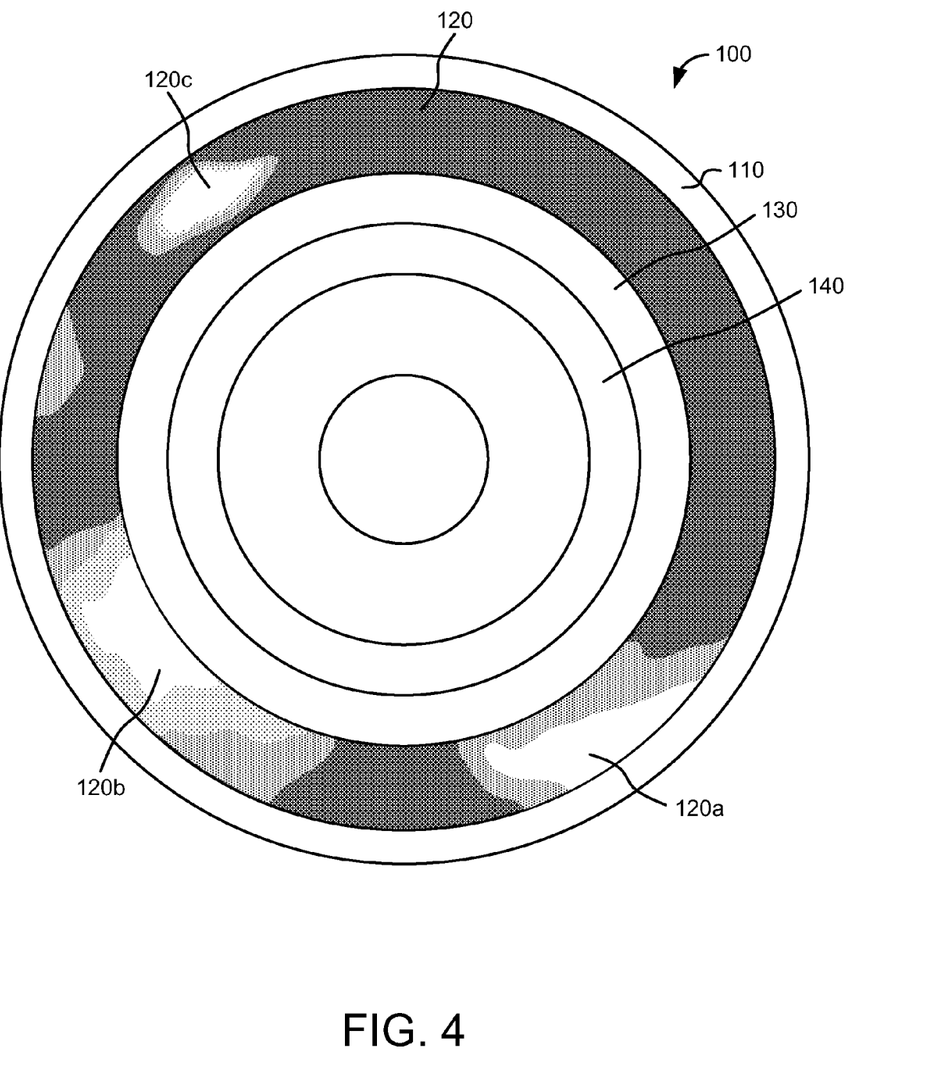
FIG. 4 is an illustration of a graphical representation of the plurality of avoided areas of the roulette wheel, according to a described implementation.

FIG. 4 is an illustration of a graphical representation of the plurality of avoided areas of the roulette wheel, according to a described implementation. The individual frames from each game of roulette at roulette wheel 100 may be added together to provide a single image of the trajectory of roulette ball 151. These individual trajectory frames may then be added together from game to game to provide the graphical representation of the plurality of avoided areas 120a, 120b, 120c of roulette wheel 100.

As previously described, the trajectories may be determined by capturing and processing frames of a video feed. For example, imaging device 111 may be positioned to capture the entire movement of the wheel including the track where the ball orbits and spins around before falling into the roulette number pocket. A frame is captured as the roulette ball moves along a trajectory on the wheel. Using each frame of a video feed, a pixel delta may be determined between the frames, which represents an incremental portion the trajectory. The pixel delta may be determined across many frames to determine the entire trajectory of the roulette ball.

A graphical representation may be generated showing avoided areas over many such trajectories to identify regions of the roulette wheel that include defects. The graphical representation may be in the form of a heat map, for example. For example, the plurality of avoided areas (least movement) may be depicted by the color blue, while the plurality of areas with the most movement may be depicted by the color red.

Figure 5:
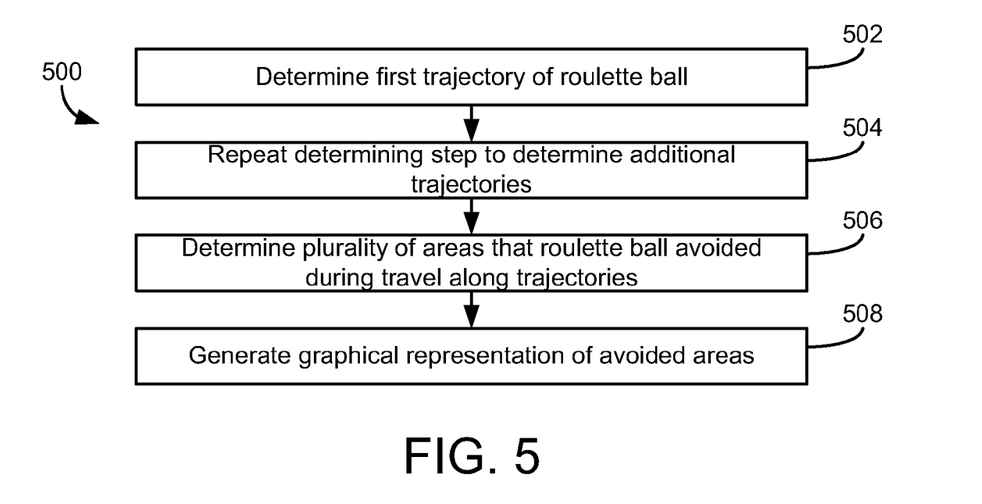
FIG. 5 is a flow diagram of a method for identifying defects in a roulette wheel, according to a described implementation.

Referring now to FIG. 5, a flow diagram of a process 500 for identifying defects in a roulette wheel is shown, according to an exemplary embodiment. Process 500 may be implemented by one or more processors executing machine instructions stored within one or more computer storage devices. For example, process 500 may be implemented to test for defects in a roulette wheel, such as roulette wheel shown in FIGS. 2-4. In general, process 500 may generate a graphical representation of the plurality of avoided areas from roulette ball trajectories to identify regions of the roulette wheel that include defects.

Process 500 includes, at 502, determining a first trajectory of a roulette ball after a launch of the roulette ball. The determination may be made by capturing the movement of the roulette ball on the roulette wheel having a region where the roulette ball orbits and spins around on before falling into a roulette number pocket. The launch of the roulette ball may be performed by a ball launching mechanism. In some implementations, the operator of the roulette game may launch the ball.

Process 500 may also include, at 504, repeating the determining step (502) to determine additional trajectories. The trajectory may be captured by an imaging device. The imaging device may be operable to provide images of each frame of the trajectory of the roulette ball to a memory, a server, etc. Each frame of the trajectories of the roulette ball may be stored by a memory.

Process 500 may include, at 506, determining a plurality of areas that the roulette ball avoided during travel along the trajectories. The determination may include combining graphical representations of the trajectories, determined in steps 502-504, to generate an aggregate graphical representation of the trajectories.

Process 500 may include, at 508, generating the graphical representation of the plurality of avoided areas to identify regions of the roulette wheel that include defects. The graphical representation may include color spaces associated with a plurality of active regions that the roulette ball touched during the trajectories and the plurality of avoided areas that the roulette ball avoided.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing agent. Alternatively or in addition, the program instructions can be encoded on an artificially-generated propagated signal, e.g., a machine-generated electrical, optical, or electromagnetic signal, that is generated to encode information for transmission to suitable receiver agent for execution by a data processing agent. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing agent on data stored on one or more computer-readable storage devices or received from other sources.

The term "client or "server" include all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and agent can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computer-implemented method for identifying defects in a roulette wheel comprising:
   determining a first trajectory of a roulette ball after a launch of the roulette ball by capturing movement of the roulette ball on the roulette wheel having a region where the roulette ball orbits and spins around on before falling into a roulette number pocket;
   repeating the determining step to determine additional trajectories;
   determining at least one area on the roulette wheel that the roulette ball avoided during travel along the trajectories; and
   generating a graphical representation of any defects on the roulette wheel, the graphical representation including the determined at least one avoided area of the roulette wheel to identify any regions of the roulette wheel that include any defects.

2. The method of claim 1, wherein determining the first trajectory further comprises:
   capturing a plurality of frames of a video feed;
   determining a delta between the plurality of frames; and
   based on the delta, adding the plurality of frames together to provide the graphical representation of the trajectory.

3. The method of claim 2, wherein determining the first trajectory further comprises:
   clamping the plurality of frames to eliminate artifacts and a plurality of areas of the roulette wheel that do not contribute to the trajectory.

4. The method of claim 3, wherein the plurality of areas of the roulette wheel that do not contribute to the trajectories comprise a spinning region of the roulette wheel.

5. The method of claim 1, wherein the graphical representation comprises indications of regions on the roulette wheel avoided by the roulette ball during the trajectories.

6. The method of claim 1, wherein the graphical representation comprises a heat map representing a frequency with which the roulette ball traveled over regions on the roulette wheel during the trajectories.

7. The method of claim 1, further comprising:
capturing, by an imaging device, the trajectories, wherein the imaging device is operable to provide images of each frame of the trajectory of the roulette ball.

8. The method of claim 7, further comprising:
storing, by a memory, the images of each frame of the trajectory of the roulette ball.

9. A controller for a gaming machine comprising:
a processor configured to
determine a first trajectory of a roulette ball after a launch of the roulette ball by capturing movement of the roulette ball on the roulette wheel having a region where the roulette ball orbits and spins around on before falling into a roulette number pocket;
repeat the determining step to determine additional trajectories;
determine at least one area on the roulette wheel that the roulette ball avoided during travel along the trajectories; and
generate a graphical representation of any defects on the roulette wheel, the graphical representation including the determined at least one avoided area of the roulette wheel to identify any regions of the roulette wheel that include any defects.

10. The controller of claim 9 wherein, to determine the first trajectory, the processor is further configured to
capture a plurality of frames of a video feed;
determine a delta between the plurality of frames; and
based on the delta, add the plurality of frames together to provide the graphical representation of the trajectory.

11. The controller of claim 10, wherein, to determine the first trajectory, the processor is further configured to
clamp the plurality of frames to eliminate artifacts and a plurality of areas of the roulette wheel that do not contribute to the trajectory.

12. The controller of claim 11, wherein the plurality of areas of the roulette wheel that do not contribute to the trajectories comprise a spinning region of the roulette wheel.

13. The controller of claim 9, wherein the graphical representation comprises indications of regions on the roulette wheel avoided by the roulette ball during the trajectories.

14. The controller of claim 9, wherein the graphical representation comprises a heat map representing a frequency with which the roulette ball traveled over regions on the roulette wheel during the trajectories.

15. The controller of claim 9, further comprising an imaging device configured to capture the trajectories, wherein the imaging device is operable to provide images of each frame of the trajectory of the roulette ball.

16. A non-transitory computer-readable storage medium having machine instructions stored therein, the instructions being executable by a processor to cause the processor to perform operations comprising:
determining a first trajectory of a roulette ball after a launch of the roulette ball by capturing movement of the roulette ball on the roulette wheel having a region where the roulette ball orbits and spins around on before falling into a roulette number pocket;
repeating the determining step to determine additional trajectories;
determining at least one area on the roulette wheel that the roulette ball avoided during travel along the trajectories; and
generating a graphical representation of any defects on the roulette wheel, the graphical representation including the determined at least one avoided area to identify any regions of the roulette wheel that include any defects.

17. The non-transitory computer readable storage medium of claim 16, wherein the operations further comprise:
capturing a plurality of frames of a video feed;
determining a delta between the plurality of frames; and
based on the delta, adding the plurality of frames together to provide the graphical representation of the trajectories.

18. The non-transitory computer readable storage medium of claim 16, wherein the operations further comprise:
clamping the plurality of frames to eliminate artifacts and a plurality of areas of the roulette wheel that do not contribute to the trajectories.

19. The non-transitory computer readable storage medium of claim 16, wherein the graphical representation comprises indications of regions on the roulette wheel avoided by the roulette ball during the trajectories.

20. The non-transitory computer readable storage medium of claim 16, wherein the graphical representation comprises a heat map representing a frequency with which the roulette ball traveled over regions on the roulette wheel during the trajectories.

* * * * *